United States Patent
Ikebe et al.

[11] Patent Number: 5,954,198
[45] Date of Patent: Sep. 21, 1999

[54] CARTRIDGE RECEIVING CASING

[75] Inventors: Masaru Ikebe; Masatoshi Okamura, both of Nagano; Noboru Uemura, Kanagawa; Hideshisa Hashimoto, Chiba, all of Japan

[73] Assignee: TDK Corporation, Japan

[21] Appl. No.: 09/178,822

[22] Filed: Oct. 26, 1998

[30] Foreign Application Priority Data

Oct. 28, 1997 [JP] Japan ................................. 9-311019
Oct. 31, 1997 [JP] Japan ................................. 9-314554
Nov. 5, 1997 [JP] Japan ................................. 9-317788

[51] Int. Cl.$^6$ ............................................... B65D 85/57
[52] U.S. Cl. ........................................ 206/308.3; 206/232
[58] Field of Search ................................. 206/308.3, 307, 206/309, 232, 308.1, 312, 387.1, 1.5; 220/345.1

[56] References Cited

U.S. PATENT DOCUMENTS

| | | | |
|---|---|---|---|
| 5,385,235 | 1/1995 | Ikebe et al. | 206/308.3 |
| 5,450,952 | 9/1995 | Funawatari et al. | 206/308.3 |
| 5,531,324 | 7/1996 | Kosaki et al. | 206/308.3 |
| 5,540,328 | 7/1996 | Kohtake | 206/308.3 |
| 5,715,935 | 2/1998 | Seki | 206/308.3 |
| 5,782,352 | 7/1998 | Senda | 206/308.3 |
| 5,881,871 | 3/1999 | Ikebe et al. | 206/308.3 |

FOREIGN PATENT DOCUMENTS 5-278775 10/1993 Japan.
9-202380 8/1997 Japan.

*Primary Examiner*—Paul T. Sewell
*Assistant Examiner*—Luan K. Bui
*Attorney, Agent, or Firm*—Lerner, David, Littenberg, Krumholz & Mentlik, LLP

[57] ABSTRACT

A cartridge receiving casing capable of permitting a cartridge to be readily removed from the casing by one hand as required while preventing the cartridge from accidentally falling off from the casing. The casing includes a casing body formed so as to be open on one side thereof to provide the casing with an opening through which a cartridge is inserted into and taken out of the casing and a cover slidably arranged on the casing body. The cartridge is engaged with first projections of stoppers at a received position, to thereby be elastically supported in the casing. When the cover is slid to an intermediate position toward the opening, the cartridge is partially exposed through the opening and elastically supported while being drawable out of the casing. Further sliding of the cover permits the cartridge to be removed from the casing.

21 Claims, 13 Drawing Sheets

CARTRIDGE RECEIVING CASING

BACKGROUND OF THE INVENTION

This invention relates to a cartridge receiving casing, and more particularly to a cartridge receiving casing constructed so as to permit a cover mounted on a casing body to be slid on the casing body to force out a cartridge from the casing.

There has been conventionally known in the art a cartridge receiving casing (hereinafter referred merely to as "casing") in which a cartridge having a disc-shaped medium such as a mini-disc (MD) or the like received therein is received in non-use.

One of such conventional casings is constructed in such a manner as shown in FIG. 21 by way of example. More specifically, a first conventional casing generally illustrated at reference numeral 10 in FIG. 21 is constituted by fittedly joining an upper casing member 11 and a lower casing member 12 to each other. The casing 10 is formed on one of side surfaces thereof with an opening 13, through which a cartridge is inserted into or removed from the casing. Also, the upper casing member 11 and lower casing member 12 are formed at an outer edge of a central portion of a side thereof facing the opening 13 with cutouts 11a and 12a of a recess-like shape, respectively. The cutouts 11a and 12a function to permit the cartridge received in the casing to be readily held between fingers for removal of the cartridge from the casing.

A second conventional casing is disclosed in Japanese Patent Application Laid-Open Publication No. 278775/1993. The second conventional casing is provided on an inside thereof with elastically displaceable lock members. When a cartridge is received in the casing, the lock members hold the cartridge in the casing, to thereby keep the cartridge from readily falling off from the casing.

A third conventional casing is disclosed in Japanese Patent Application Laid-Open Publication No. 202380/1997. The disclosed casing includes a lower casing member and a movable cover adapted to be slid on the lower casing member. Sliding of the cover permits a cartridge received in the casing to be forced out from the casing. Also, the casing is so constructed that elastic force of an elastic mechanism for preventing falling-off of the cartridge from the casing permits the cartridge to be held in the casing even when the movable cover is slid to the utmost. More particularly, the elastic mechanism is integrally formed with a side wall and the cartridge is pressedly held by the elastic mechanism not only during being received in the casing but also after being forced out.

The first conventional casing 10 described above permits the cartridge to fall off from the casing by its own weight as desired when the opening 13 is turned down, however, it possibly causes the cartridge to accidentally fall off therefrom.

Also, the first and second conventional casings described above each require to use both hands for removal of the cartridge from the casing, to thereby render handling thereof inconvenient or troublesome. In addition, the casings each cause insertion of an index card into the casing and removal of the index card from the casing to be troublesome.

Further, in the third conventional casing, sliding of the movable cover permits the cartridge to be partially exposed through a discharge opening. However, in this state as well, the cartridge is held in the casing by elastic force, so that removal of the cartridge from the casing ultimately requires to use both hands. Also, in the third conventional casing, sliding of the movable cover causes an index card to be forced out from the casing together with the cartridge. Further, in the third conventional casing, the lower casing member is typically made of a transparent resin material such as PC (polycarbonate) or the like, so that it is not possible to use a resin material increased in elasticity such as POM or the like for formation of the elastic mechanism. It would be considered that a separate member such as a metallic spring or the like is fixed in the lower casing member. However, this requires to arrange the member at each of at least two positions of the casing member, resulting in the number of parts being increased and assembling of the casing being troublesome.

SUMMARY OF THE INVENTION

The present invention has been made in view of the foregoing disadvantages of the prior art.

Accordingly, it is an object of the present invention to provide a cartridge receiving casing which is capable of permitting a cartridge received in the casing to be readily removed from the casing by one hand as required.

It is another object of the present invention to provide a cartridge receiving casing which is capable of effectively preventing a cartridge received in the casing from accidentally falling off from the casing.

It is a further object of the present invention to provide a cartridge receiving casing which is capable of stably receiving an index card therein.

It is still another object of the present invention to provide a cartridge receiving casing which is capable of preventing an index card from being removed from the casing during removal of a cartridge therefrom.

It is a still further object of the present invention to provide a cartridge receiving casing which is capable of elastically supporting a cartridge in the casing with a simplified structure.

In accordance with the present invention, a cartridge receiving casing is provided. The casing includes a casing body formed so as to be open on one side thereof to provide the casing with an opening through which a cartridge provided with clamping portions is inserted into and taken out of the casing and a cover provided with hooks and slidably arranged on the casing body. The casing also includes stoppers each arranged in the casing body and each including a first engagement and a second engagement which are engaged with one of the clamping portions of the cartridge at a first position at which the cartridge is received in the casing and at a second position at which the cartridge is partially exposed through the opening to elastically support the cartridge by means of force of a predetermined level, respectively. The casing body is formed with projections adapted to be engaged with the hooks of the cover at a position at which the clamping portions of the cartridge are each engaged with the second engagement of a corresponding one of the stoppers. The cover is provided with elastically deformable arms in a manner to be connected to the hooks, respectively. The hooks of the cover are each formed so as to be moved over a corresponding one of the projections due to sliding of the cover.

When the cartridge is received in the casing, the clamping portions of the cartridge are engaged with the first engagements of the stoppers, resulting in the cartridge being held in the casing. When the cover is slid toward the opening, the cartridge is forced toward the opening by the cover, engagement between the clamping portions of the cartridge and the first engagements of the stoppers is released, leading to movement of the cartridge toward the opening. When the cover is further slid toward the opening, to thereby engage the hooks of the cover with the projections of the casing body, the cartridge is partially exposed through the opening while keeping the clamping portions of the cartridge engaged with the second engagements of the stoppers, resulting in being held in the casing. In this instance, the cartridge may be forcibly drawn out of the casing. Further sliding of the cover permits the hooks of the cover to be moved over the projections of the casing body, to thereby release engagement between the clamping portions of the cartridge and the second engagements of the stoppers, so that the cartridge may be removed through the opening of the casing.

In a preferred embodiment of the present invention, the casing body is provided at a portion thereof positioned between the opening and the projections with anti-dislocation projections so as not to permit each of the hooks to be moved over the anti-dislocation projection from a side opposite to the opening.

Thus, when the cover is slid to a last position, the hooks of the cover are abutted against the anti-dislocation projections to regulate further movement of the cover.

In a preferred embodiment of the present invention, the hooks of the cover are each formed so as to be moved over the anti-dislocation projection from the side of the opening. This permits fitting the cover on the casing body.

In a preferred embodiment of the present invention, the casing body is provided on an inner bottom surface thereof with an index card region for arranging an index card thereon. The cover is slid to define an opening on an upper side of the casing body through which the index card is inserted into and taken out of the casing. The casing body is provided on the inner bottom surface thereof with a regulation means for regulating movement of the index card in the casing.

Thus, when the index card is arranged in the casing, movement of the index card is regulated by the regulation means. Therefore, when the cover is slid to remove the cartridge from the casing, only the cartridge is moved while keeping the index card from being moved in the casing.

In a preferred embodiment of the present invention, the regulation means is constituted of a stepped portion formed on the inner bottom surface of the casing body by depressing the index card region from the remaining part of the inner bottom surface. Alternatively, the regulation means may be constituted of projections formed on a portion of the inner bottom surface of the casing body in proximity to a side wall of the casing body opposite to the opening of the casing and adapted to be engaged with cutouts provided in the index card.

In a preferred embodiment of the present invention, the casing body is provided with stopper mounting portions. The stoppers each include a fit-in section engaged with a corresponding one of the stopper mounting portions of the casing body, and first and second elastically flexible arms respectively provided on both sides of the fit-in section so as to extend therefrom. The first engagement described above is constituted by a first projection provided on the first arm and the second engagement described above is constituted by a second projection provided on the second arm. Thus, the first projections of the stoppers are engaged with the clamping portions of the cartridge during receiving of the cartridge in the casing, to thereby elastically support the cartridge. The second projections of the stoppers are engaged with the clamping portions of the cartridge at the position at which the cartridge is partially exposed. Thus, the cartridge may be elastically supported at different positions by means of the same stoppers.

In a preferred embodiment of the present invention, the cover is provided with regulation surface regions for regulating upward movement of the stoppers, wherein the regulation surface regions are each arranged in proximity to an upper surface of each of the first and second arms.

In a preferred embodiment of the present invention, the casing body is provided on an inner bottom surface thereof with stepped regulation portions for regulating deflection of the first and second arms. The first and second arms of the stopper are each at least partially fitted in one of the stepped regulation portions.

In a preferred embodiment of the present invention, the fit-in section of the stopper is provided on an upper side thereof with a slide assisting portion on which the cover is slid.

In a preferred embodiment of the present invention, the cover is provided on an outer surface thereof with an operation section acting as a finger holder during sliding of the cover. The operation section is constituted by ruggedness formed on the outer surface. The slide assisting portion is provided in a region which corresponds to a range of movement of the operation section during sliding of the cover.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENTS

Figure 1A:
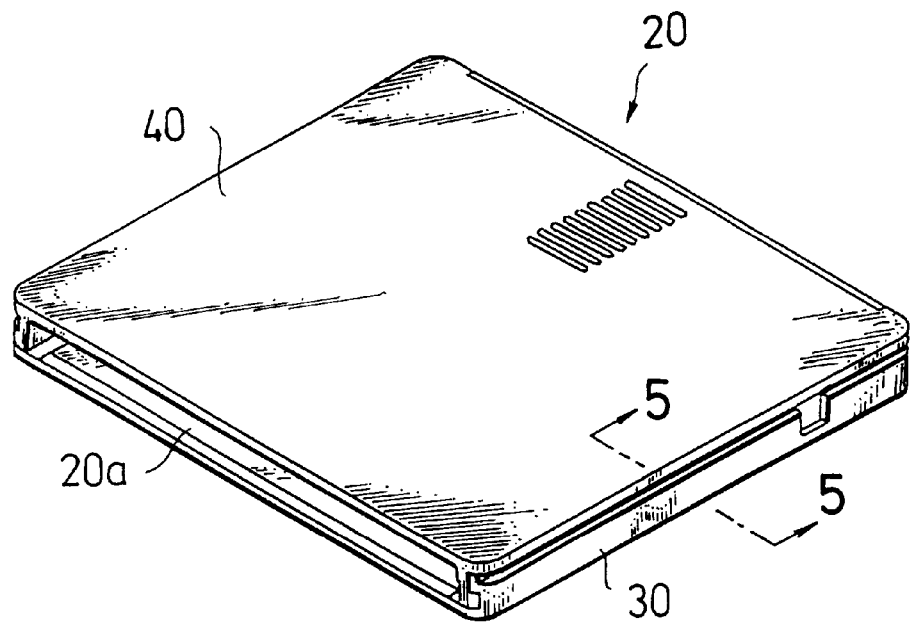
FIG. 1A is a perspective view showing a first embodiment of a cartridge receiving casing according to the present invention, wherein a cover is kept closed.
Figure 1B:
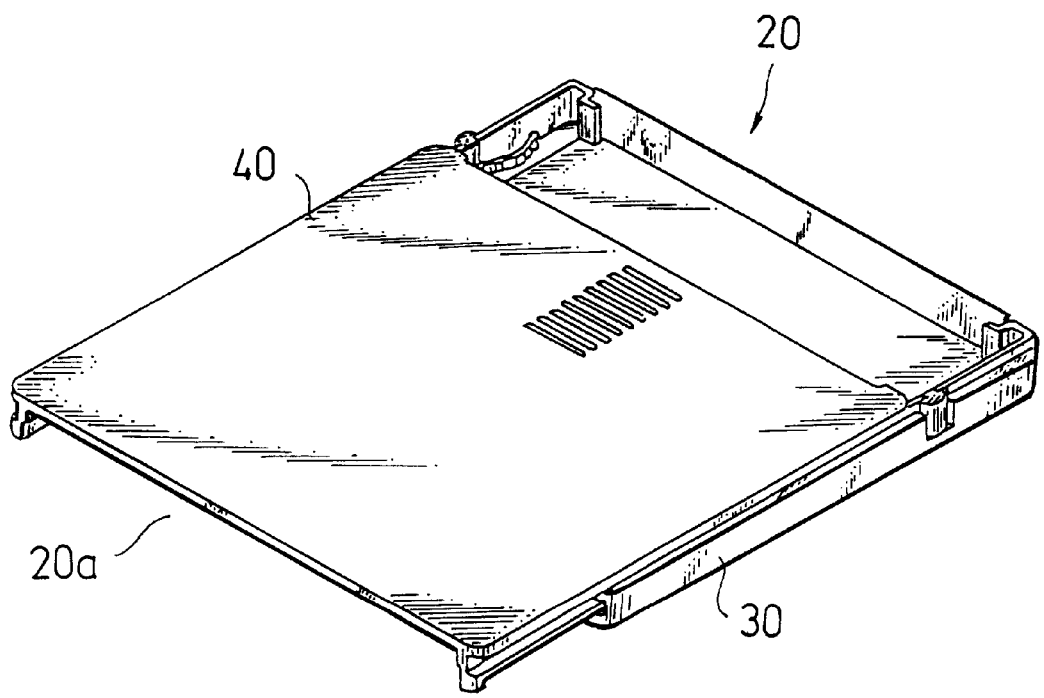
FIG. 1B is a perspective view showing the first embodiment of the cartridge receiving casing according to the present invention, wherein the cover is kept open.

Now, a cartridge receiving casing according to the present invention will be described hereinafter with reference to FIGS. 1A to 20.

Referring first to FIGS. 1A to 15, a first embodiment of a cartridge receiving casing (hereinafter referred merely to as "casing") according to the present invention is illustrated. A casing of the illustrated embodiment generally designated at reference numeral 20 generally includes a casing body 30 and a cover 40 slidably mounted or fitted on the casing body 30. The casing 20 is formed at one of side surfaces thereof with an opening 20a through which a cartridge is inserted into or removed from the casing 20. In the illustrated embodiment, the opening 20a is formed on a front side of the casing 20. The cover 40 is slid on the casing body 30 from a closed position shown in FIG. 1A to an opened position shown in FIG. 1B to force out the cartridge received in the casing 20 therefrom.

The casing body 30 and cover 40 may each be made of a transparent resin material such as, for example, PC (polycarbonate), AS (SAN, acrylonitrile styrene copolymer), PS (polystyrene), PMMA (polymethyl methacrylate) or the like.

Figure 2:
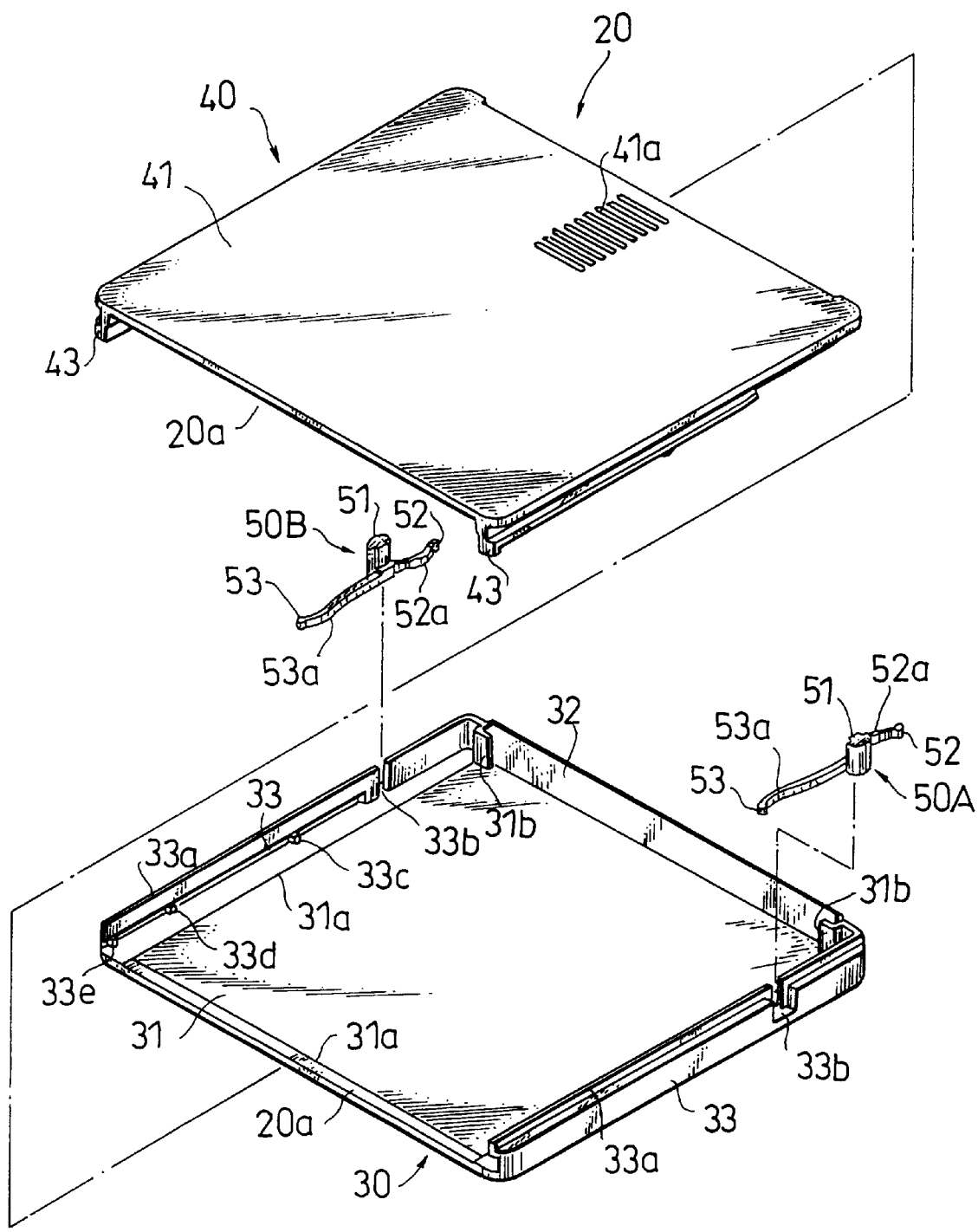
FIG. 2 is an exploded perspective view of the casing shown in FIG. 1A.
Figure 10:
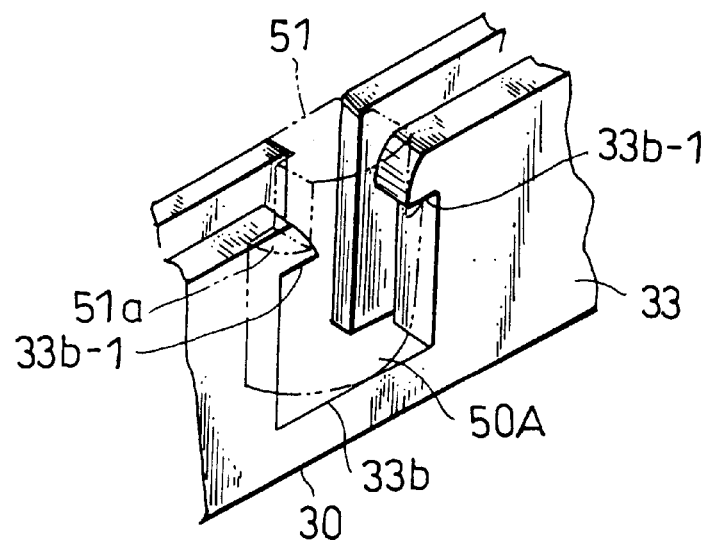
FIG. 10 is a fragmentary enlarged perspective view showing a stopper mounting portion of a casing body in the casing.

The casing body 30, as shown in FIG. 2, includes a bottom wall 31, and side walls 32 and 33 arranged on three sides of the casing body 30 other than the side thereof on which the opening 20a is provided. In the illustrated embodiment, the side walls include a rear side wall 32 and a pair of lateral side walls 33 arranged opposite to each other. The lateral side walls 33 are each provided on an upper side or end thereof with an L-shaped fit-in section 33a adapted to be fitted in the cover 40. Also, the lateral side walls 33 are each formed with a recess-like cutout 33b formed so as to be upwardly open and acting as a stopper mounting portion. The stopper mounting portions 33b are adapted to fit stoppers 50A and 50B therein, respectively. In the casing of the illustrated embodiment, as shown in FIG. 10, the stopper mounting portions 33b of the lateral side walls 33 of the casing body 30 are each formed at opposing upper ends of an outer portion thereof with hook-like holders 33b-1, which function to hold a corresponding one of the stoppers 50A and 50B.

Figure 11:
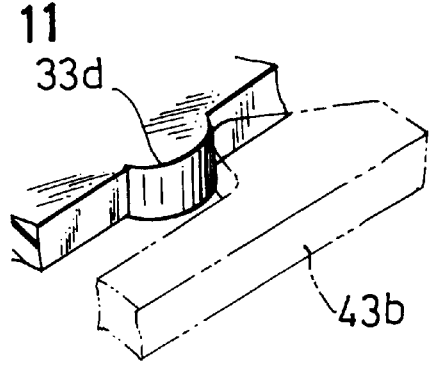
FIG. 11 is a fragmentary enlarged perspective view showing a projection of the casing body for holding the cover at an intermediate position.
Figure 12:
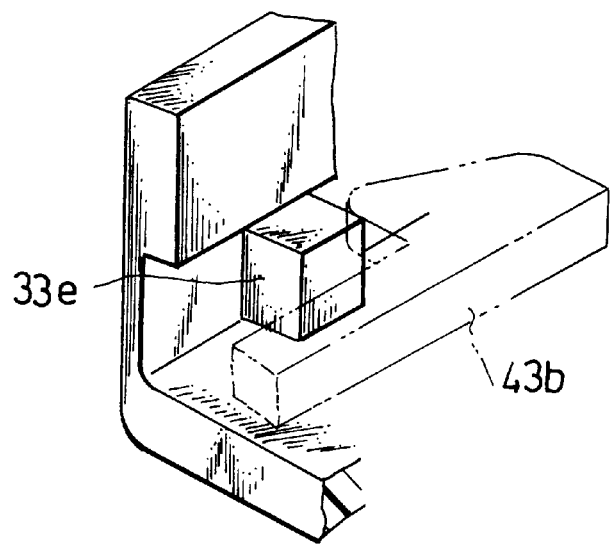
FIG. 12 is a fragmentary enlarged perspective view showing an anti-dislocation projection of the casing body for the cover.

Also, the casing body 30 is formed on an inner surface of each of the lateral side walls 33 thereof with a first projection 33c, a second projection 33d and an anti-dislocation projection 33e in a manner to be spaced from each other in order at predetermined intervals in a longitudinal direction of the lateral side walls 33, as shown in FIG. 2. The first projections 33c are each adapted to be abutted against a corresponding one of the stoppers 50A and 50B. The second projections 33d and anti-dislocation projection 33e are adapted to be engaged with the cover 40. Each of the second projections 33d, as shown in FIG. 11, is formed to have a substantially semi-cylindrical shape. The anti-dislocation projections 33e function to prevent the cover 40 from being dislocated from the casing body 30 and are each formed to have a substantially rectangular parallelopiped shape as shown in FIG. 12.

The casing body 30 is provided on an inner bottom surface thereof or an inner surface of the bottom wall 31 thereof with a stepped portion 31a so that a region on the inner bottom surface on which an index card 70 described hereinafter is placed is depressed or recessed from the remaining region thereof.

Also, the casing body 30 is provided thereon with a pair of L-shaped projections 31b in a manner to be positioned at corners defined between the rear side wall 32 and the lateral side walls 33 while being symmetric with each other. The L-shaped projections 31b are each formed so as to be connected to the bottom wall 31 and the rear side wall 32. In the illustrated embodiment, the stepped portion 31a and projections 31b cooperate with each other to provide a regulation means for regulating movement of the index card 70 in the casing 20.

Figure 3:
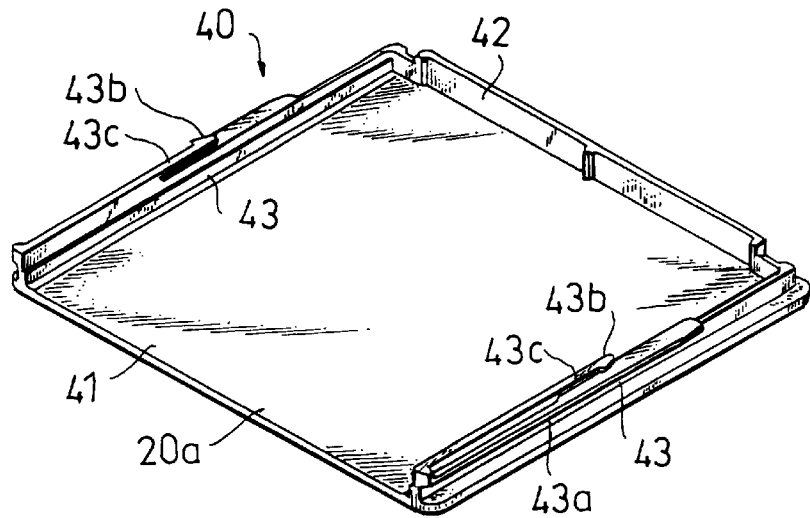
FIG. 3 is a perspective view showing the cover of the casing shown in FIG. 1A, wherein the cover is turned inside up.

The cover 40, as shown in FIGS. 2 and 3, includes a top wall 41, and side walls 42 and 43 arranged on three sides of the cover 40 other than a side thereof facing the opening 20a. In the illustrated embodiment, the side walls include a rear side wall 42 and a pair of lateral side walls 43 arranged opposite to each other. The top wall 41, as shown in FIG. 2, is provided on an outer surface thereof with an operation section 41a. The operation section 41a is provided by ruggedness formed on the outer surface of the top wall 41. The operation section 41a functions to prevent slippage of a finger of a user on the cover 40 when the cover 40 is slid on the casing body 30 by means of the finger.

The rear side wall 42 functions to force out the cartridge received in the casing 20 therefrom when the cover 40 is slid on the casing body 30 in a direction opposite to the rear side wall 42 in order to remove the cartridge from the casing. Thus, the rear side wall 42 is positioned inside the rear side wall 32 of the casing body 30 when the cover 40 is fittedly mounted on the casing body 30. Also, the rear side wall 42 is formed to have a height which permits a gap of a predetermined size to be defined between a lower end of the rear side wall 42 and the bottom wall 31 of the casing body 30.

The lateral side walls 43 are each provided on an outer surface thereof with an L-shaped or recess-like fit-on section 43a in which the fit-in section 33a of a corresponding one of the lateral side walls 33 of the casing body 30 is fitted. Also, the lateral side walls 43 are each formed on a lower end side thereof with an elastically deformable pawl or hook 43b as shown in FIG. 3.

Figure 13:
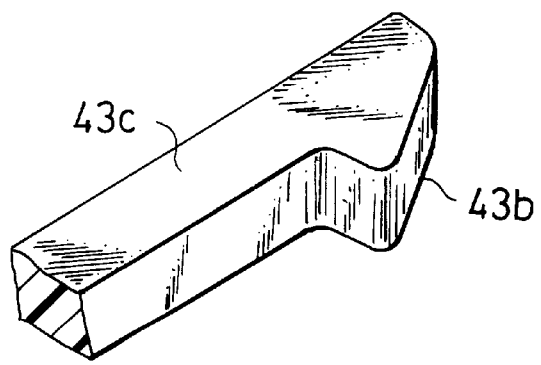
FIG. 13 is a fragmentary enlarged perspective view showing a hook of the cover.

The elastically deformable pawl or hook 43b of each of the lateral side walls 43 of the cover 40 is constructed in such a manner as shown in FIG. 13. The hook 43b is formed at a distal end thereof with a somewhat round shape and connected to an elastically deflectable or flexible arm 43c, resulting in being elastically movable inwardly of the cover 40. The hook 43b is adapted to be engaged with the second projection 33d and anti-dislocation projection 33e as shown in FIGS. 11 and 12.

Figure 4A:
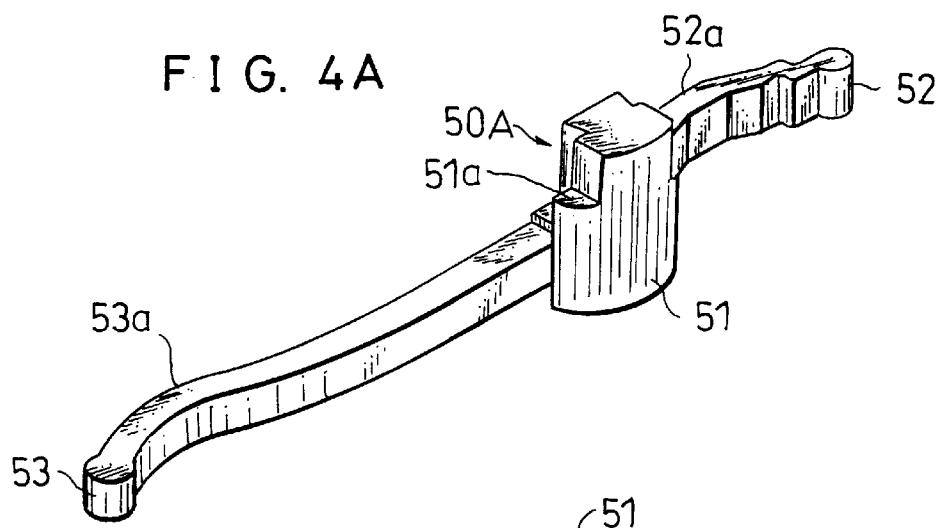
FIGS. 4A and 4B each are a perspective view showing a respective stopper incorporated in the casing.
Figure 4B:
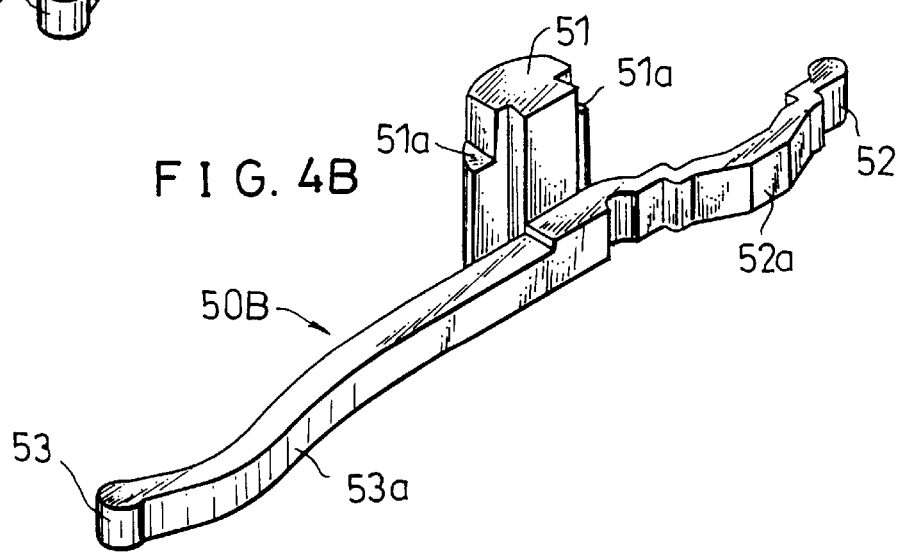

Now, the stoppers 50A and 50B will be described hereinafter with reference to FIGS. 4A and 4B. The stoppers 50A and 50B are made of resin increased in elasticity and sliding properties such as POM (polyacetal resin), unlike those for the casing body 30 and the cover 40. The stoppers 50A and 50B, as shown in FIGS. 4A and 4B, are formed to have shapes laterally symmetric with each other. The stoppers 50A and 50B each include a fit-in section 51 fitted in a corresponding one of the recess-like stopper mounting portions 33b of the casing body 30, and first and second elastically deformable arms 52 and 53 provided on both sides of the fit-in section 51 so as to outwardly extend therefrom in opposite directions. The fit-in section 51 of each of the stoppers 50A and 50B is formed at both sides of an upper end thereof with cutouts 51a of a substantially L-shape as shown in FIGS. 4A and 4B, which are engaged with the respective hook-like holders 33b-1 of the casing body 30 as shown in FIG. 10. The first arm 52 and second arm 53 of each of the stoppers 50A and 50B are provided with a first engagement 52a and a second engagement 53a, respectively. The first and second engagements 52a and 53a are formed so as to arcuately project inwardly of the casing 20.

Figure 7:
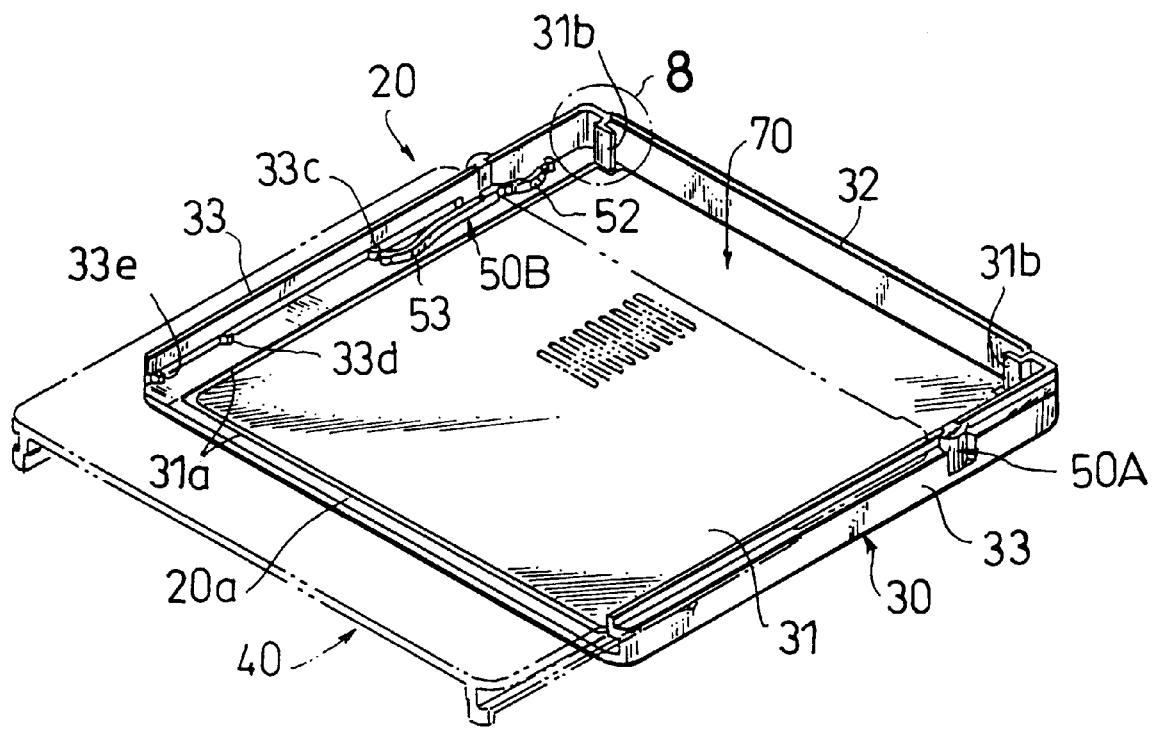
FIG. 7 is a perspective view showing the casing of FIG. 1A and an index card arranged in the casing.

The casing body 30 is fitted therein with the stoppers 50A and 50B and then the cover 40 is fittedly mounted on the casing body 30, resulting in the casing 20 shown in FIG. 1 being provided. In fitting of each of the stoppers 50A and 50B in a corresponding one of the stopper mounting portions 33b of the casing body 30, the hook-like holders 33b-1 are elastically deformed, so that the fit-in section 51 of each of the stoppers 50A and 50B is fitted in the stopper mounting portion 33b and the holders 33b-1 are positioned on the respective L-shaped cutouts 51a of the fit-in section 51. This results in each of the stoppers 50A and 50B being incorporated in the casing body 30 in a manner to be kept from being upwardly dislocated therefrom as shown in FIG. 10. Also, the second arm 53 of each of the stoppers 50A and 50B is positioned at an end thereof on the first projection 33c of the casing body 30 as shown in FIG. 7.

Fitting of the cover 40 on the casing body 30, as shown in FIG. 2, is carried out in such a manner that the cover 40 is engaged at a portion thereof on a side of the rear side wall 42 thereof with a portion of the casing body 30 on a side of the opening 20a and then slid on the casing body 30 toward the rear side wall 32 of the casing body 30 to fit the fit-on sections 43a of the lateral side walls 43 of the cover 40 on the respective fit-in sections 33a of the lateral side walls 33 of the casing body 30. This results in the cover 40 being slidable on the casing body 30 while being prevented from being vertically moved with respect to the casing body 30.

When fitting of the cover 40 on the casing body 30 is started, the hooks 43b of the cover 40 are each abutted at the distal end thereof against the anti-dislocation projection 33e of a corresponding one of the lateral side walls 33 of the casing body 30. In this instance, the distal end of the hook 43b is tapered as shown in FIG. 13, so that the arm 43c connected to the hook 43b is inwardly deflected with sliding of the cover 40 on the casing body 30. This permits the hook 43b to be moved over the anti-dislocation projection 33e.

Further sliding of the cover 40 toward the rear side wall 32 of the casing body 30 causes each of the hooks 43b to be abutted against a corresponding one of the second projections 33d. Then, the hook 43b is moved over the second projection 33d in the same manner as described above. Then, the cover 40 is finally advanced to a position at which the rear side wall 42 of the cover 40 is abutted against the rear side wall 32 of the casing body 30.

Figure 5:
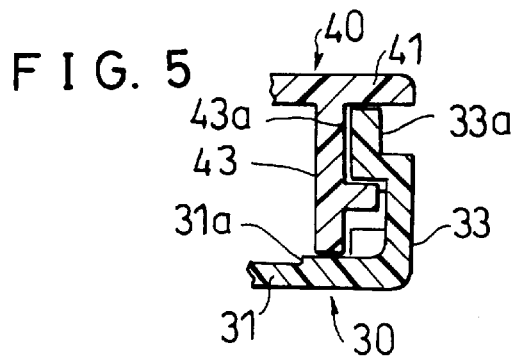
FIG. 5 is a fragmentary vertical sectional view taken along line 5—5 of FIG. 1A.

When the fitting of the cover 40 on the casing body 30 is thus attained, the L-shaped fit-in sections 33a of the casing body 30 are each fitted in a corresponding one of the recess-like fit-on sections 43a of the cover 40 as shown in FIG. 5. At this time, the lateral side walls 43 of the cover 40 are positioned outside the stepped portion 31a of the bottom wall 31 of the casing body 30.

Figure 6A:
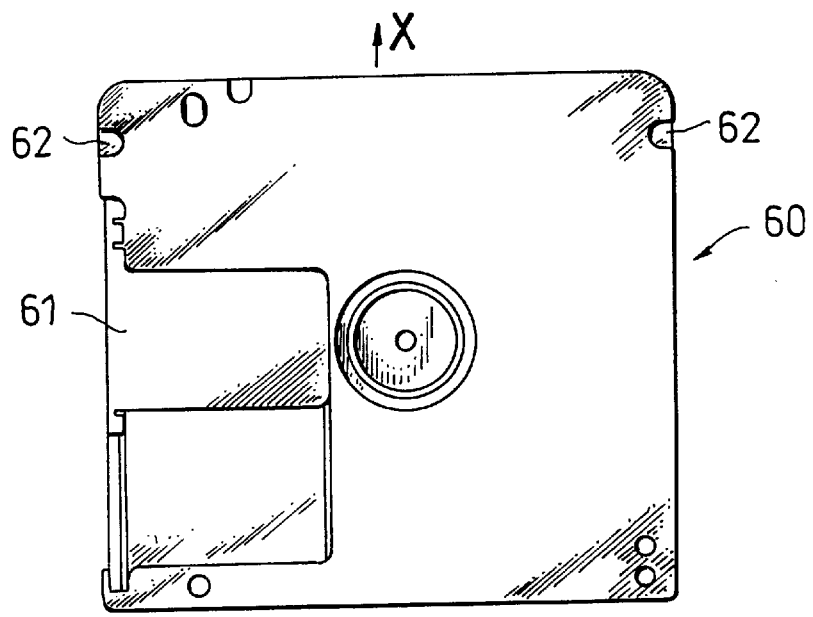
FIG. 6A is a bottom view showing a lower side of a cartridge to be received in the casing shown in FIG. 1A.
Figure 6B:
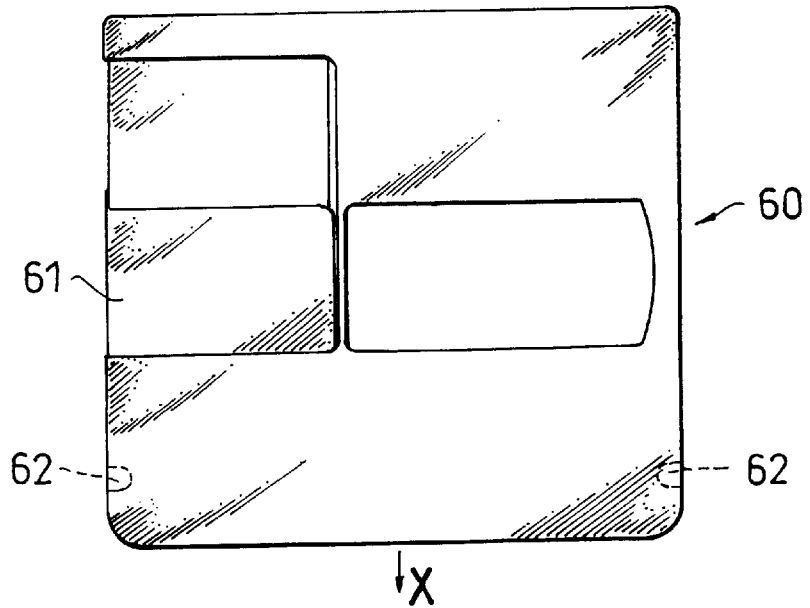
FIG. 6B is a top view showing an upper side of the cartridge shown in FIG. 6A.

A cartridge which may be received in the casing 20 of the illustrated embodiment thus constructed may be constructed as shown in FIGS. 6A and 6B, wherein the cartridge is generally designated at reference numeral 60. The cartridge 60 is constructed in the form of a disc cartridge which has a mini-disc or optical disc received therein and is provided thereon with a shutter 61 which is selectively opened and closed. The cartridge 60 is formed on a lower surface on a first side thereof on which the shutter 61 is mounted and a second side opposite to the first side with clamping portions 62 in a manner to be laterally symmetric with each other. The clamping portions 62 may each be formed by depressing a part of the lower surface of the cartridge 60 in a U-shape. When the cartridge 60 is inserted in an information recording/reproducing apparatus, the clamping portions 62 of the cartridge 60 are used for positioning the cartridge 60 by being engaged with a clamp of the apparatus.

Figure 14:
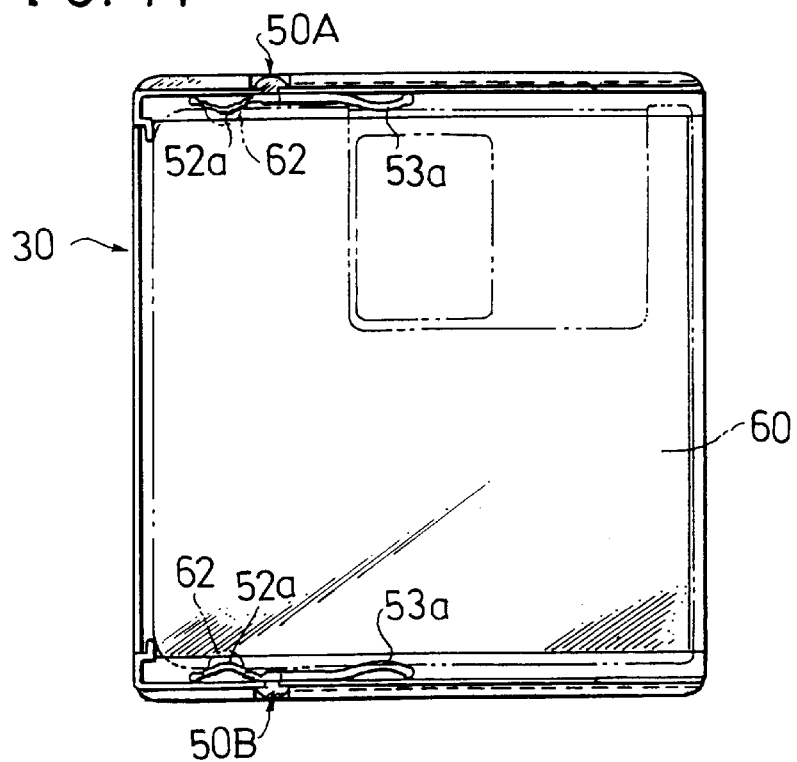
FIGS. 14 and 15 each are a plan view showing engagement between the cartridge and stoppers in the casing.

The cartridge 60 is inserted through the opening 20a of the casing 20 into the casing 20 in a direction indicated at X in FIG. 6A while keeping an upper surface thereof facing up. When the cartridge 60 is received in the casing 20, the clamping portions 62 of the cartridge 60 are engaged with the respective first engagements 52a of the stoppers 50A and 50B, to thereby hold the cartridge 60 in the casing 20 as shown in FIG. 14. In this state, the cartridge 60 is held in the casing 20 by force substantially equal to force required for drawing the cartridge out of the casing 20 through the opening 20a. Thus, the cartridge 60 is held in the casing 20 while keeping engagement between the clamping portions 62 of the cartridge 60 and the first engagements 52a of the stoppers 50A and 50B from being released due to a weight of the cartridge 60 when the opening 20a of the casing 20 is turned down.

Removal of the cartridge 60 from the casing 20, as shown in FIG. 7, is carried out by sliding the cover 40 on the casing body 30 toward the opening 20a. First, when sliding of the cover 40 is started, the cartridge 60 is forced by the rear side wall 42 of the cover 40, resulting in engagement between the clamping portions 62 of the cartridge 60 and the first engagements 52a of the stoppers 50A and 50B being released, so that the cartridge may be moved toward the opening 20a. After the engagement is thus released, elastic force of the second arms 53 of the stoppers 50A and 50B permits the second engagements 53a to urge the cartridge 60 by force sufficient to prevent natural falling-off of the cartridge 60 from the casing 20. Further sliding of the cover 40 leads to abutment of the elastically deformable hooks 43b of the cover 40 against the second projections 33d of the casing body 30.

Figure 15:
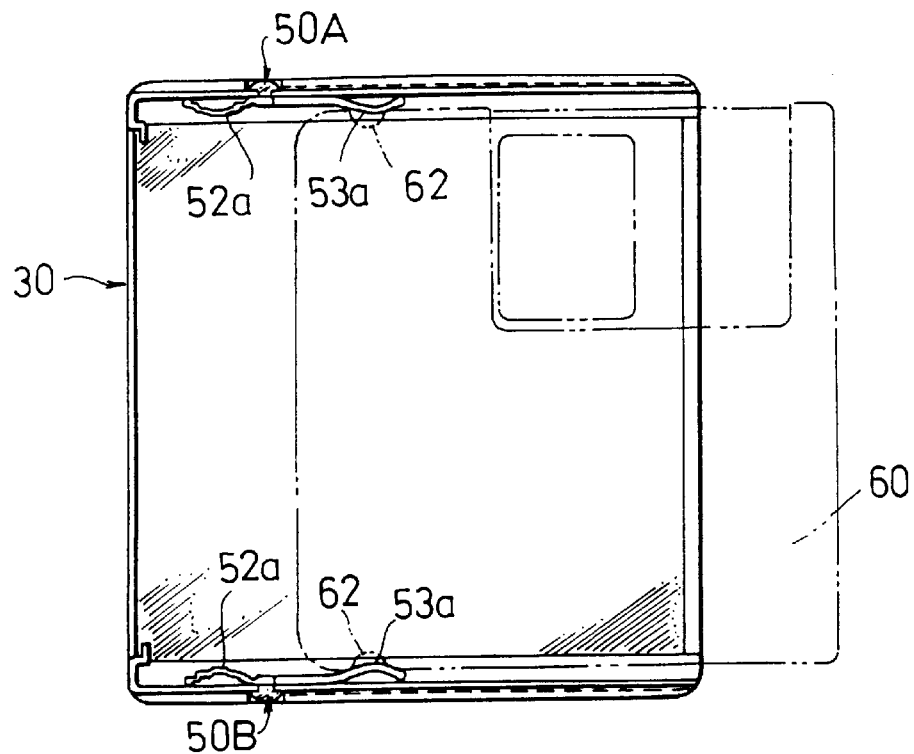
Figure 16:
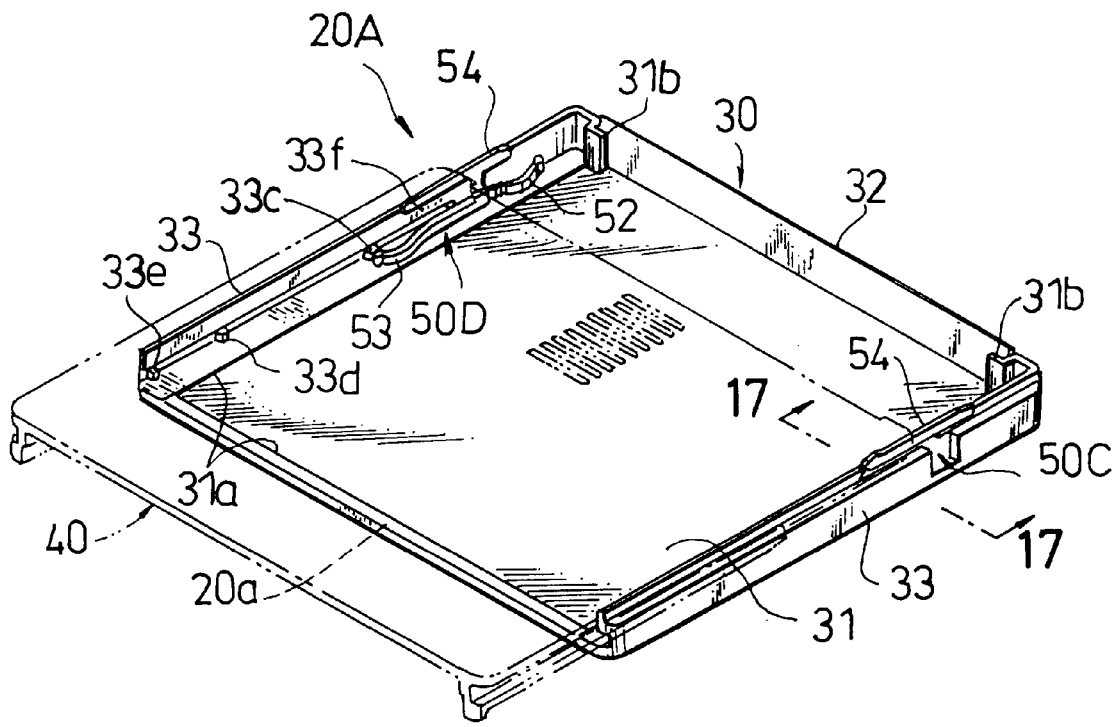
FIG. 16 is a perspective view showing an essential part of a second embodiment of a cartridge receiving casing according to the present invention.

At a position of the cover 40 thus located (hereinafter referred to as "intermediate position"), the clamping portions 62 of the cartridge 60 are engaged with the respective second engagements 53a of the stoppers 50A and 50B, as shown in FIG. 15. At this state, each of the first projections 33c of the casing body 30 permits the corresponding second engagement 53a to exhibit elastic force. This permits the cartridge 60 to be held at the intermediate position by means of force sufficient to prevent the cartridge 60 from readily falling off from the opening 20a of the casing 20. Even when the cover 40 is slid to the original position in an opposite direction, the clamping portions 62 of the cartridge 60 are kept engaged with the respective second engagements 53a of the stoppers 50. Force by which the second engagements 53a hold the cartridge 60 is preferably set to be less than holding force of the first engagements 52a, because such setting improves handling of the cartridge 60.

Further sliding of the cover 40 from the intermediate position toward the opening 20a by means of force above a predetermined level permits each of the arms 43c connected to the respective hooks 43b of the lateral side walls 43 to be deflected inwardly of the casing body 30, resulting in the hooks 43b being moved over the respective second projections 33d, so that the cover 40 may be further moved toward the opening 20a. At this time, engagement between the clamping portions 62 of the cartridge 60 and the second engagements 53a of the stoppers 50A and 50B is released, so that the cartridge 60 may be moved toward the opening 20a while being forced by the rear side wall 42 of the cover 40. After the engagement is released, the casing 20 holds the cartridge 60 from lateral sides thereof no longer.

Further sliding of the cover 40 leads to engagement of the hooks 43b of the cover 40 with the respective anti-dislocation projections 33e of the casing body 30 arranged in proximity to the opening 20a as shown in FIG. 12, so that more further sliding of the cover 40 may be restricted. More particularly, the second projections 33d are formed to have a substantially semi-cylindrical shape, so that engagement between the second projections 33d and the hooks 43b may be relatively readily released. Whereas, the anti-dislocation projections 33e are formed to have a substantially rectangular parallelopiped shape, to thereby keep engagement between the anti-dislocation projections 33e and the hooks 43b from being released due to sliding of the cover 40.

At a position of the cover 40 thus located (hereinafter referred to as "last position"), the cartridge 60 may be removed through the opening 20a from the casing 20. Thus, when a user lightly slides the cover 40 on the casing body 30, the cover 40 is stopped at the intermediate position. At the intermediate position of the cover 40, the cartridge 60 is held in the casing 20 by force sufficient to prevent the cartridge 60 from falling off from the casing 20, resulting in the cartridge 60 being kept from being dropped from the casing 20 accidentally or by mistake. Also, at the intermediate position, the cartridge 60 is partially exposed from the opening 20a, so that the user may draw the cartridge 60 out of the casing 20. This results in the engagement between the clamping portions 62 of the cartridge 60 and the second engagements 53a of the stoppers 50A and 50B being released, so that the cartridge 60 may be removed from the casing 20.

Also, when the user somewhat strongly slides the cover 40 on the casing body 30, the cover 40 is moved to the last position at a stretch without being stopped at the intermediate position, so that the cartridge 60 may be naturally removed from the casing 20. Thus, the cartridge 60 may be readily removed from the casing 20 by one hand. However, in this instance as well, reaction force occurring when the hooks 43b are moved over the second projections 33d at the intermediate position is applied to the cover 40, so that the user may recognize that the casing 20 holds the cartridge 60 no longer, to thereby keep the cartridge 60 from accidentally falling off from the casing 20. Also, the cover 40 is locked due to the engagement between the pawls or hooks 43b and the anti-dislocation projections 33e at the last position, to thereby be prevented from being dislocated from the casing body 30.

Now, the index card 70 will be described hereinafter with reference to FIGS. 7 to 9. The index card 70, as shown in FIG. 7, is formed by bending a single sheet-like material into a substantially L-shape along a folding or bending line and arranged so as to cover the inner surface of the bottom wall 31 of the casing body 30 and an inner surface of the rear side wall 32.

Figure 8:
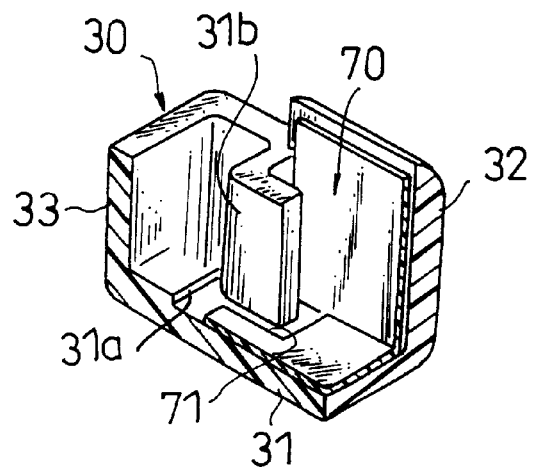
FIG. 8 is a fragmentary enlarged perspective view in section showing a part indicated at a circle 8 of a dashed line in FIG. 7.
Figure 9:
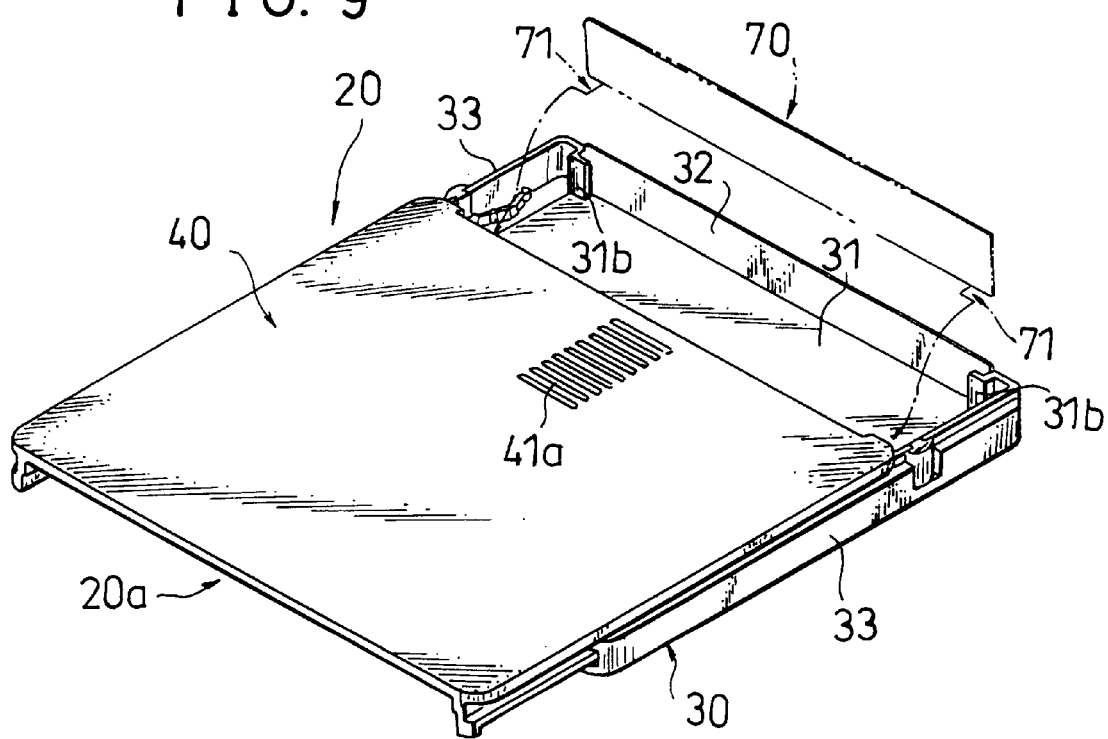
FIG. 9 is a perspective view showing insertion and taking out of the index card with respect to the casing of FIG. 1A.

The index card 70, as shown in FIG. 8, is formed at an outer edge thereof on each of opposite sides thereof in proximity to the bending line with a cutout 71, which is engaged with a corresponding one of the projections 31b provided on the bottom wall 31 of the casing body 30.

The index card 70 is so placed that a portion thereof put on the bottom wall 31 of the casing body 30 is positioned inside the stepped portion 31a formed on the bottom wall 31. In this instance, a height of the stepped portion 31a and a thickness of the index card 70 are preferably formed so as to be substantially equal to each other, because this permits an upper surface of the index card 70 and an edge of the bottom wall 31 of the casing body 30 to be substantially flush with each other.

Insertion of the index card 70 into the casing 20 or removal of the index card 70 therefrom, as shown in FIG. 7, is carried out by sliding the cover 40 on the casing body 30 to the intermediate position to partially open the casing body 30. Then, as shown in FIG. 9, the index card 70 is inserted into or removed from the casing 20 through a portion of the casing body thus rendered open.

As described above, the lower end of the rear side wall 42 of the cover 40 and the bottom wall 31 of the casing body 30 are arranged so as to define the gap therebetween while being kept from being abutted against each other. Thus, the index card 70 may be placed on the inner surface of the bottom wall 31 of the casing body 70 through the gap. At this time, the cutouts 71 of the index card 70 may be engaged with the respective projections 31b of the casing body 30.

In particular, in the illustrated embodiment, the cutouts 71 of the index card 70 and the projections 31b of the casing body 30 are arranged in proximity to the rear side wall 32 of the casing body 30, so that engagement between the cutouts 71 and the projections 31b may be facilitated without requiring to fully slide the cover 40.

When the cover 40 is closed while keeping the index card 70 received in the casing 20, the index card 70 is pressedly held at a portion thereof facing the rear side wall 32 of the casing body 30 by the rear side wall 42 of the cover 40.

Also when the cartridge 60 is kept received in the casing 20 while keeping the index card 70 arranged therein, sliding of the cover 40 can force out only the cartridge 60 from the casing 20. More particularly, during removal of the cartridge 60 from the casing 20, force acting to urge the index card 70 toward the opening 20a is exerted on the index card 70 due to friction between the cartridge 60 and the index card 70. Nevertheless, the cutouts 71 of the index card 70 are kept engaged with the projections 31b of the casing body 30 and the stepped portion 31a formed on the bottom wall 31 of the casing body 30 restricts sliding of the index card 70 on the bottom wall 31, so that movement of the index card 71 in the casing 20 may be effectively prevented.

The illustrated embodiment may be modified in various ways. For example, in the illustrated embodiment, the stoppers 50A and 50B are held by the hook-like holders 33b-1 of the casing body 30. Alternatively, the stoppers 50A and 50B may be pressedly fitted in the casing body 30. In the illustrated embodiment, the stepped portion 31a is provided so as to act as one of the regulation means. Instead, the bottom wall 31 of the casing body 30 may be provided on an outer edge of a side thereof on which the opening 20a is arranged with a rib-like projection or projections. This likewise regulates movement of the index card 70 toward the opening 20a.

The operation section 41a of the cover 40 may be constituted by roughening the portion of the outer surface of the cover 40 on which the operation section 41a is arranged more than the remaining portion of the outer surface.

The casing body 30 and cover 40 may each be formed on an outer edge thereof on a side of the opening 20a with a cutout, to thereby facilitate removal of the cartridge 60 from the casing 20, as in the prior art described above with reference to FIG. 21.

The above-description has been made in connection with the cartridge 60 for an MD by way of example. However, it is a matter of course that the illustrated embodiment may be effectively applied to a cartridge for any desired disc-like medium such as a magnetic disc like a 3.5-inch floppy disc, other than an MD.

In the illustrated embodiment, the stepped portion 31a and projections 31b cooperate together to provide the regulation means for regulating movement of the index card 70. However, such a regulation means may be effectively provided by only any one of the stepped portion 31a and projections 31b.

As described above, the casing of the illustrated embodiment is so constructed that light sliding of the cover permits it to be stopped on the way to the last position, resulting in the cartridge being held on the second engagements of the stoppers while being partially exposed through the opening of the casing. Such construction facilitates drawing of the cartridge from the casing and prevents it from accidentally falling off from the casing. Also, it permits further sliding of the cover to lead to discharge of the cartridge from the casing, resulting in removal of the cartridge being readily attained by one hand.

Further, the illustrated embodiment effectively prevents the cover from being dislocated from the casing body when the cover is ultimately slid. Moreover, the illustrated embodiment permits fitting of the cover on the casing body to be accomplished by merely sliding the cover with respect to the casing body.

In addition, the illustrated embodiment permits the cartridge received in the casing to be taken out of the casing by one hand while keeping the index card from being displaced due to sliding of the cover. Also, insertion of the index card into the casing or removal of the index card therefrom may be readily carried out by merely sliding the cover on the casing body. Further, the illustrated embodiment facilitates insertion or removal of the index card with respect to the casing, because it eliminates any interference between the index card and the regulation means.

Referring now to FIGS. 16 to 18B, an essential part of a second embodiment is illustrated. A cartridge receiving casing of the second embodiment is constructed in substantially the same manner as the first embodiment except that stoppers 50C and 50D are substituted for the stopper 50A and 50B. More particularly, the stoppers 50C and 50D each include a fit-in section 51, which is provided on an upper side thereof with a slide assisting portion 54 of a substantially T-shape. The stoppers 50C and 50D are different in this respect from the stoppers 50A and 50B of the first embodiment described above. Correspondingly, a casing body 30 is formed on each of lateral side walls 33 thereof with a cutout 33f in which the sliding assisting portion 54 is engagedly fitted.

The stoppers 50C and 50D are made of POM (polyacetal resin) or the like. This is for the reason that the casing body 30 and a cover 40 are each made of a transparent resin material, therefore, it is desired to interpose the slide assisting portion 54 made of POM or the like between the casing body 30 and the cover 40 to improve a sliding function of the cover 40. Another reason is that POM or the like exhibits elasticity sufficient to act as a stopper.

Figure 17:
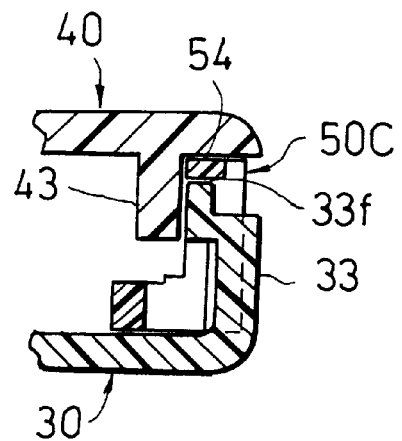
FIG. 17 is a fragmentary sectional view taken along line 17—17 of FIG. 16.
Figure 18:
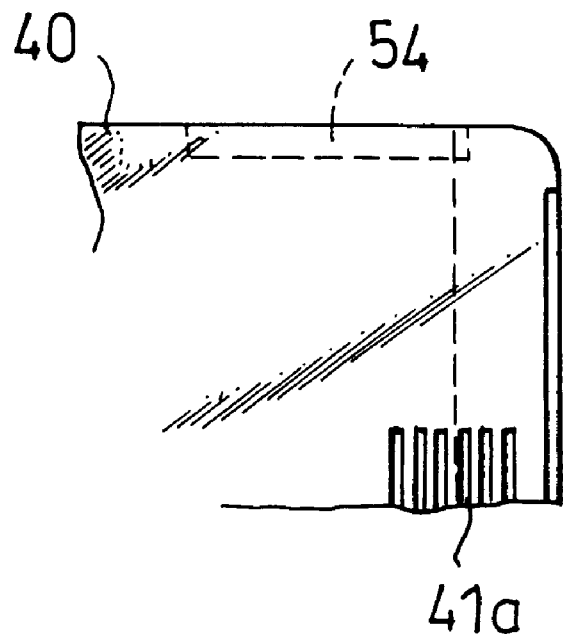
FIGS. 18A and 18B each are a fragmentary plan view showing positional relationship between a moving range of an operation section of a cover during sliding operation and a slide assisting section in the second embodiment of the casing according to the present invention.
Figure 18:
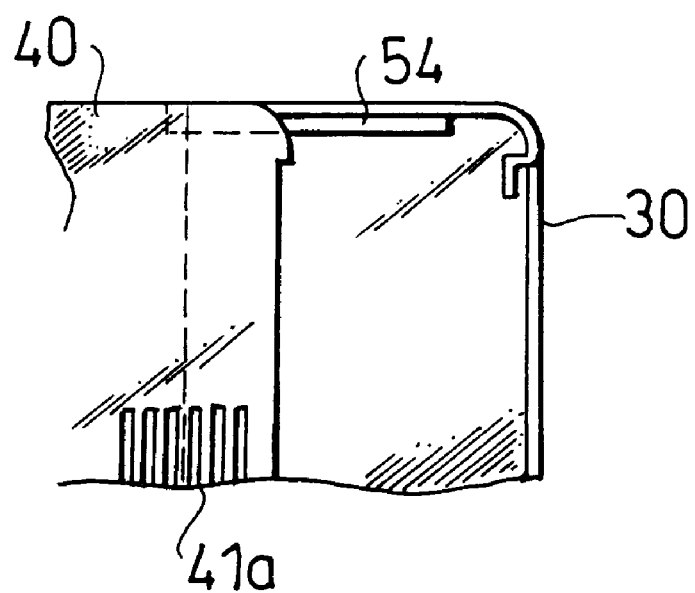

When fitting of the cover 40 on the casing body 30 is executed, the slide assisting portions 54 of the stoppers 50C and 50D are interposedly arranged between the casing body 30 and the cover 40 as shown in FIG. 17, so that the cover 40 may be slid substantially on the slide assisting portions 54 during sliding operation. Thus, in the first embodiment described above, sliding is carried out between the casing body 30 and the cover 40 which are made of the same resin material such as PC resin; whereas the second embodiment permits sliding between difference resin materials such as, for example, between PC resin (the cover 40) and POM resin increased in sliding properties (the slide assisting portion 54), to thereby ensure smoother sliding of the cover 40 and eliminate shaving or wearing of the casing body 30 due to use over a long period of time.

Referring now to FIGS. 18A and 18B, positional relationship between a range of movement of an operation section 41a of the cover 40 and one of the slide assisting portions 54 is illustrated. Sliding of the cover 40 causes the operation section 41a to be moved from a position shown in FIG. 18A to a position shown in FIG. 18B. Thus, each of the slide assisting portions 54 is preferably arranged so as to extend over a region which corresponds to the range of movement of the operation section 41a. Such construction permits both sides of the operation section 41a of the cover 40 to which force is applied to the utmost during sliding of the cover 40 to be slid on the slide assisting portions 54.

The remaining part of the illustrated embodiment may be constructed in substantially the same manner as the first embodiment described above.

The slide assisting portions 54 are each arranged on a part of each of the lateral side walls 33 of the casing body 30. Alternatively, it may be provided on the whole side wall 33.

Figure 19A:
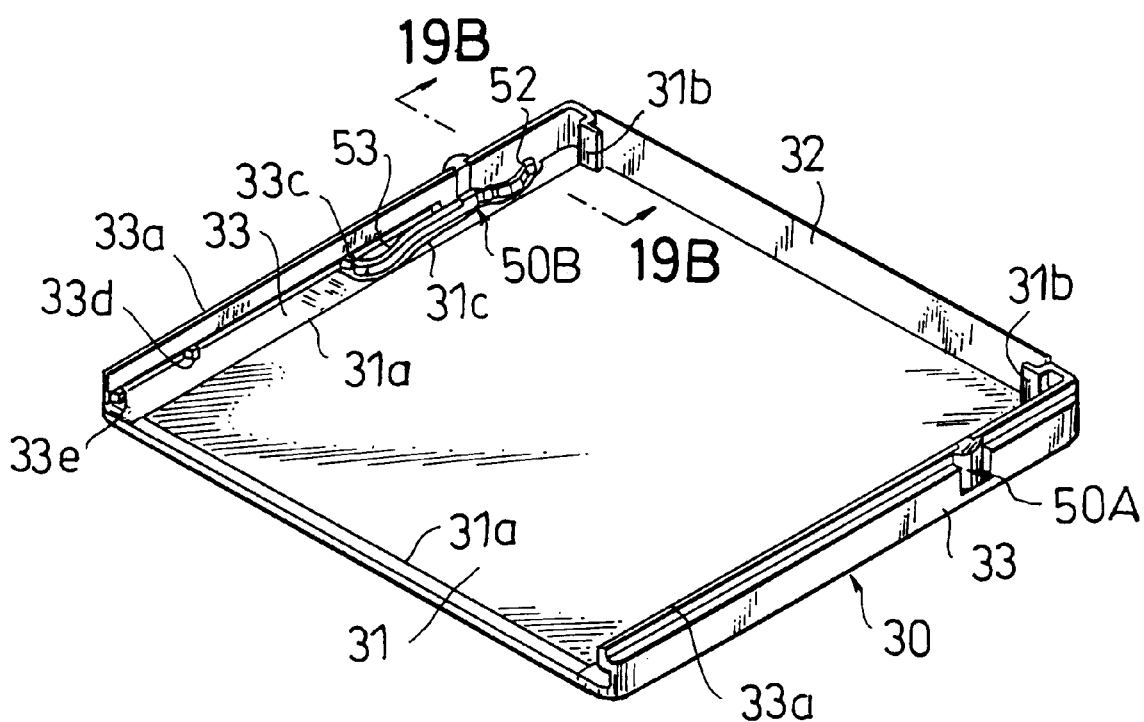
FIG. 19A is a perspective view showing a casing body provided therein with stoppers in a third embodiment of a cartridge receiving casing according to the present invention.
Figure 19B:
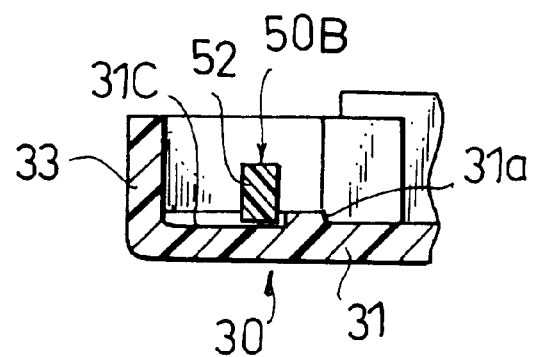
FIG. 19B is a fragmentary enlarged sectional view taken along line 19B—19B of FIG. 19A.
Figure 19C:
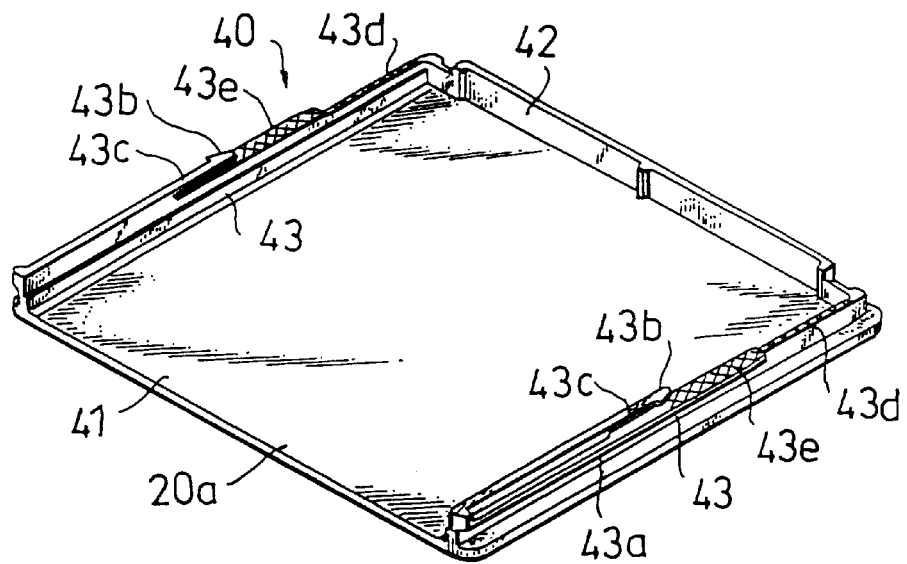
FIG. 19C is a perspective view showing the cover in the third embodiment of the casing, wherein the cover is turned inside up.

Referring now to FIGS. 19A to 19C as well as FIGS. 1A to 2, 4A to 6B, 8 to 15, a third embodiment of a cartridge receiving casing according to the present invention is illustrated. In a casing of the illustrated embodiment, lateral side walls 43 of a cover 40, as shown in FIG. 19C, are each formed on a portion of a lower surface thereof positioned near to a rear side wall 42 thereof with regulation surface regions 43d and 43e in a manner to be, respectively, close to upper surfaces of a first arm 52 and a second arm 53 of one of stoppers 50A and 50B, as indicated by crosshatching. The regulation surface regions 43d and 43e function to regulate upward movement of the arms 52 and 53 of the stoppers 50A and 50B.

The stoppers 50a and 50B are incorporated in the casing body 30 as shown in FIGS. 19A and 19B. More particularly, the stoppers 50A and 50B are each so arranged that a distal end of the second arm 53 is positioned on a corresponding one of first projections 33c of the casing body 30. The casing body 30 is formed on a portion of an upper or inner surface of a bottom wall 31 thereof in proximity to each of lateral side walls 33 with a stepped portion 31c for regulation in a manner to be recessed from the remaining portion so as to correspond to a configuration of a corresponding one of the stoppers 50A and 50B. The stoppers 50A and 50B are each arranged on the stepped regulation portion 31C. This permits unnecessary movement and excessive deflection of the arms 52 and 53 of the stoppers 50A and 50B to be regulated, to thereby ensure that the stoppers 50A and 50B carry out stable operation.

The cover 40 fitted on the casing body 30 carries out only sliding on the casing body 30 while being kept from being vertically moved with respect to the casing body 30. When fitting of the cover 40 on the casing body 30 is attained, substantially L-shaped fit-in sections 33a of the casing body 33 are each fitted in a corresponding one of recess-like fit-on sections 43a of the cover 40 in the same manner as that shown in FIG. 5. Also, the regulation surface regions 43d and 43e of the cover 40 are arranged in proximity to the arms 52 and 53 of the stoppers 50A and 50B, to thereby regulate unnecessary upward movement of the arms 52 and 53.

The remaining part of the third embodiment may be constructed in substantially the same manner as each of the first and second embodiments described above.

As can be seen from the foregoing, the third embodiment effectively prevents the cartridge from accidentally falling off from the casing and permits the cartridge to be readily inserted into or taken out of the casing. Also, it regulates unnecessary movement of the stoppers and leads to an increase in sliding properties of the cover.

Figure 20:
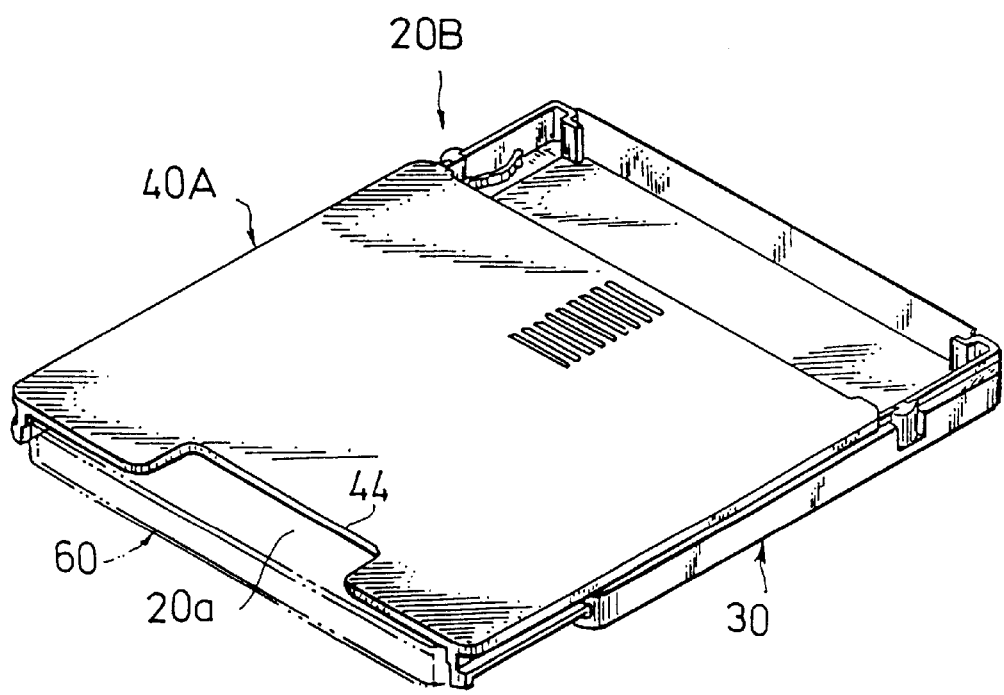
FIG. 20 is a perspective view showing a fourth embodiment of a cartridge receiving casing according to the present invention.

Referring now to FIG. 20, a fourth embodiment of the present invention is generally illustrated. A cartridge receiving casing of the illustrated embodiment which is generally designated at reference numeral 20B is constructed in substantially the same manner as the first embodiment described above except a cover 40A. The cover 40A is constructed in substantially the same manner as the cover 40 in the first embodiment, except that the cover 40A is formed at a central portion of an outer edge thereof defined on a side of an opening 20a of the casing 20B with a recess-like cutout 44.

Figure 21:
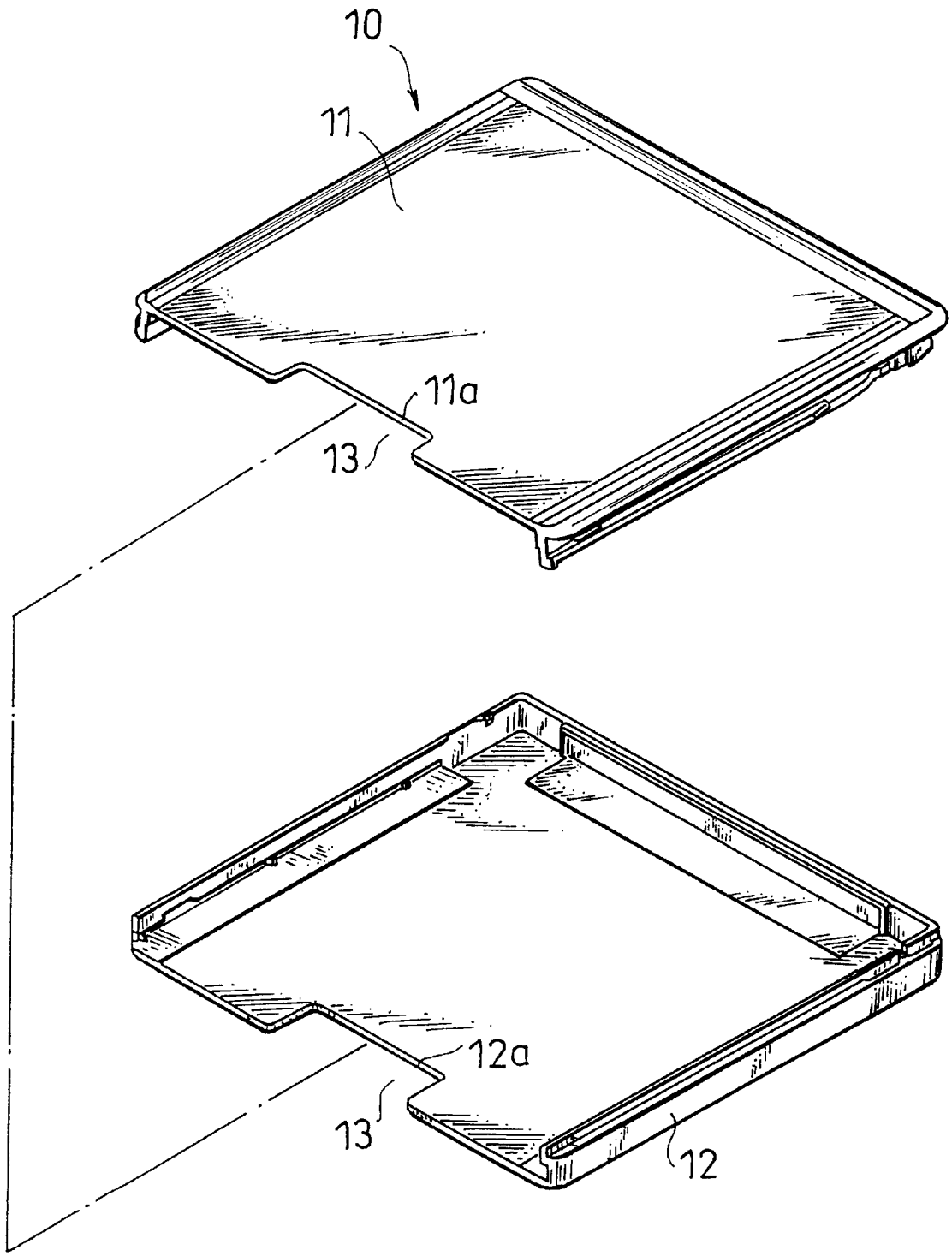
FIG. 21 is an exploded perspective view showing a conventional casing.

Such construction of the cover 40A permits a cartridge 60 to be removed from the casing 20B by merely drawing it out of the casing 20B without sliding the cover 40A as in the prior art shown in FIG. 21. In this instance, it is required to carry out drawing of the cartridge 60 from the casing 20B by means of force sufficient to permit engagement between clamping portions 62 of the cartridge 60 and first engagements 52a of stoppers 50A and 50B to be released.

Thus, a user may remove the cartridge 60 from the casing 20B without sliding the cover 40A. Alternatively, removal of the cartridge 60 may be attained by sliding the cover 40A to an intermediate position thereof in substantially the same manner as described above and then drawing the cartridge 60 out of the casing 20B or by sliding the cover 40A to a final position thereof, followed by drawing of the cartridge 60 from the casing 20B.

The remaining part of the illustrated embodiment may be constructed in substantially the same manner as the first to third embodiments described above.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A cartridge receiving casing comprising:

a casing body formed so as to be open on one side thereof to provide said casing with an opening through which a cartridge provided with clamping portions is inserted into and taken out of said casing;

a cover provided with hooks and slidably arranged on said casing body; and stoppers each arranged in said casing body and each including a first engagement and a second engagement which are engaged with one of the clamping portions of the cartridge at a first position at which the cartridge is received in said casing and at a second position at which the cartridge is partially exposed through said opening to elastically support the cartridge by means of force of a predetermined level, respectively;

said casing body being formed with projections adapted to be engaged with said hooks of said cover at a position at which the clamping portions of the cartridge are each engaged with said second engagement of a corresponding one of said stoppers;

said cover being provided with elastically deformable arms in a manner to be connected to said hooks, respectively;

said hooks of said cover each being formed so as to be moved over a corresponding one of said projections due to sliding of said cover.

2. A cartridge receiving casing as defined in claim 1, wherein said casing body is provided at a portion thereof positioned between said opening and said projections with anti-dislocation projections so as not to permit each of said hooks to be moved over said anti-dislocation projection from a side opposite to said opening.

3. A cartridge receiving casing as defined in claim 2, wherein said hooks of said cover are each so formed that it may be moved over said anti-dislocation projection from the side of said opening.

4. A cartridge receiving casing as defined in claim 1, wherein said casing body is provided on an inner bottom surface thereof with an index card region for arranging an index card thereon;

said cover is slid to define an opening on an upper side of said casing body through which the index card is inserted into and taken out of said casing; and said casing body is provided on said inner bottom surface thereof with a regulation means for regulating movement of the index card in said casing.

5. A cartridge receiving casing as defined in claim 4, wherein said regulation means is constituted of a stepped portion formed on said inner bottom surface of said casing body by depressing said index card region from the remaining part of said inner bottom surface.

6. A cartridge receiving casing as defined in claim 4, wherein said regulation means is constituted of projections formed on a portion of said inner bottom surface of said casing body in proximity to a side wall of said casing body opposite to said opening of said casing and adapted to be engaged with cutouts provided in the index card.

7. A cartridge receiving casing as defined in claim 5, wherein said regulation means is constituted of projections formed on a portion of said inner bottom surface of said casing body in proximity to a side wall of said casing body opposite to said opening of said casing and adapted to be engaged with cutouts provided in the index card.

8. A cartridge receiving casing as defined in claim 1, wherein said casing body is provided with stopper mounting portions; and said stoppers each include a fit-in section engaged with a corresponding one of said stopper mounting portions of said casing body, and first and second elastically flexible arms respectively provided on both sides of said fit-in section so as to extend therefrom;

said first engagement being constituted by a first projection provided on said first arm;

said second engagement being constituted by a second projection provided on said second arm.

9. A cartridge receiving casing as defined in claim 8, wherein said cover is provided with regulation surface regions for regulating upward movement of said stoppers;

said regulation surface regions each being arranged in proximity to an upper surface of each of said first and second arms.

10. A cartridge receiving casing as defined in claim 8, wherein said casing body is provided on an inner bottom surface thereof with stepped regulation portions for regulating deflection of said first and second arms;

said first and second arms of said stopper each being at least partially fitted in one of said stepped regulation portions.

11. A cartridge receiving casing as defined in claim 9, wherein said casing body is provided on an inner bottom surface thereof with stepped regulation portions for regulating deflection of said first and second arms;

said first and second arms of said stopper each being at least partially fitted in one of said stepped regulation portions.

12. A cartridge receiving casing as defined in claim 8; wherein said fit-in section of each of said stoppers is provided on an upper side thereof with a slide assisting portion on which said cover is slid.

13. A cartridge receiving casing as defined in claim 9, wherein said fit-in section of each of said stoppers is provided on an upper side thereof with a slide assisting portion on which said cover is slid.

14. A cartridge receiving casing as defined in claim 10, wherein said fit-in section of each of said stoppers is provided on an upper side thereof with a slide assisting portion on which said cover is slid.

15. A cartridge receiving casing as defined in claim 11, wherein said fit-in section of each of said stoppers is provided on an upper side thereof with a slide assisting portion on which said cover is slid.

16. A cartridge receiving casing as defined in claim 12, wherein said cover is provided on an outer surface thereof with an operation section acting as a finger holder during sliding of said cover;

said operation section being constituted by ruggedness formed on said outer surface;

said slide assisting portion being provided in a region which corresponds to a range of movement of said operation section during sliding of said cover.

17. A cartridge receiving casing as defined in claim 13, wherein said cover is provided on an outer surface thereof with an operation section acting as a finger holder during sliding of said cover;

said operation section being constituted by ruggedness formed on said outer surface;

said slide assisting portion being provided in a region which corresponds to a range of movement of said operation section during sliding of said cover.

18. A cartridge receiving casing as defined in claim 14, wherein said cover is provided on an outer surface thereof with an operation section acting as a finger holder during sliding of said cover;

said operation section being constituted by ruggedness formed on said outer surface;

said slide assisting portion being provided in a region which corresponds to a range of movement of said operation section during sliding of said cover.

19. A cartridge receiving casing as defined in claim 15, wherein said cover is provided on an outer surface thereof with an operation section acting as a finger holder during sliding of said cover;

said operation section being constituted by ruggedness formed on said outer surface;

said slide assisting portion being provided in a region which corresponds to a range of movement of said operation section during sliding of said cover.

20. A cartridge receiving casing comprising:

a casing body formed so as to be open on one side thereof to provide said casing with an opening through which a cartridge is inserted into and taken out of said casing; and a cover slidably arranged on said casing body;

said casing body being provided on an inner bottom surface thereof with an index card region for arranging an index card thereon;

said cover being slid to define an opening on an upper side of said casing body through which the index card is inserted into and taken out of said casing;

said casing body being provided on said inner bottom surface thereof with a regulation means for regulating movement of said index card in said casing.

21. A cartridge receiving casing comprising:

a casing body formed so as to be open on one side thereof to provide said casing with an opening through which a cartridge provided with clamping portions is inserted into and taken out of said casing;

a cover slidably arranged on said casing body; and stoppers each arranged in said casing body and engaged with the clamping portions of the cartridge to hold the cartridge in said casing body;

said casing body being formed with stopper mounting portions;

said stoppers each including a fit-in section engaged with a corresponding one of said stopper mounting portions of said casing body, and first and second elastically flexible arms respectively provided on both sides of said fit-in section so as to extend therefrom;

said first arm being formed with a first projection, which is engaged with a corresponding one of said clamping portions of said cartridge at a first position at which the cartridge is received in said casing to elastically support the cartridge;

said second arm being formed with a second projection, which is engaged with a corresponding one of the clamping portions of the cartridge at a second position at which the cartridge is partially exposed through said opening to elastically support the cartridge.

* * * * *

UNITED STATES PATENT AND TRADEMARK OFFICE
CERTIFICATE OF CORRECTION

PATENT NO.   : 5,954,198
DATED        : September 21, 1999
INVENTOR(S)  : Ikebe et al.

It is certified that error appears in the above-identified patent and that said Letters Patent is hereby corrected as shown below:

On the title page, Item
  [75] Inventors: "Hideshisa" should read --Hidehisa--.

Signed and Sealed this

Ninth Day of May, 2000

Attest:

Q. TODD DICKINSON

*Attesting Officer*    *Director of Patents and Trademarks*